(12) United States Patent
Dai

(10) Patent No.: US 6,241,371 B1
(45) Date of Patent: Jun. 5, 2001

(54) ACTIVATING DEVICE FOR LIGHT-EMITTING WHEEL

(76) Inventor: Jen Hao Dai, No. 11 Lane 11, Chang Kuo Rd., Chung Li, Tao Yuan Hsien (TW)

(*) Notice: Subject to any disclaimer, the term of this patent is extended or adjusted under 35 U.S.C. 154(b) by 0 days.

(21) Appl. No.: 09/383,441

(22) Filed: Aug. 27, 1999

(51) Int. Cl.[7] .................... B60Q 1/11; B62J 6/00
(52) U.S. Cl. .............. 362/500; 362/469; 362/184; 362/802; 362/276; 362/464; 362/473; 280/816
(58) Field of Search .................... 362/500, 223, 362/224, 225, 226, 251, 253, 184, 276, 394, 800, 802

(56) References Cited

U.S. PATENT DOCUMENTS

| | | | |
|---|---|---|---|
| 4,763,230 | * 8/1988 | Cummings et al. | 362/78 |
| 4,787,014 | * 11/1988 | Wodder et al. | 362/78 |
| 5,392,200 | * 2/1995 | Milde | 362/78 |
| 5,584,562 | * 12/1996 | Geran | 362/72 |
| 5,653,523 | * 8/1997 | Roberts | 362/78 |
| 5,873,600 | * 2/1999 | Conway | 280/816 |
| 6,170,968 | * 1/2001 | Caswell | 362/469 |

* cited by examiner

Primary Examiner—Sandra O'Shea
Assistant Examiner—David V. Hobden
(74) Attorney, Agent, or Firm—Rosenberg, Klein & Lee

(57) ABSTRACT

An activating device for light-emitting wheel comprises a wheel, a sound and light generating circuit, a plurality of light emitting elements and a plurality of conductive wires. The wheel has a hub at the center of the wheel, a plurality of spokes radially arranged around the hub and a rim arranged around the outer contour of the plurality of spokes. An interspace chamber is formed between two adjacent spokes. The sound and light generating circuit is arranged within one of the interspace chambers. The sound and light generating circuit has a housing case, two conductive plates, an activating element and a top cover on the housing case. The two conductive plates are of the same structure and have slantingly bent bottom portions. The two conductive plates are such mounted on the housing case that a predetermined separation is kept between the two slantingly bent bottom portions thereof.

11 Claims, 6 Drawing Sheets

ACTIVATING DEVICE FOR LIGHT-EMITTING WHEEL

FIELD OF THE INVENTION

The present invention relates to an activating device for light-emitting wheel, especially to an activating device having an activating element moved axially, by the centrifugal force of the rotating wheel, to electrically connect two conductive plates such that alarming sound and lighting are generated for warning.

BACKGROUND OF THE INVENTION

The wheels are widely used fixtures, for examples, vehicle or skating shoes use wheels for easy movement. However, the conventional wheel for vehicle such as bicycle comprises a hub at the center of wheel and a plurality of spokes extending radially form the hub. The spokes sweep quickly when the wheel is rotated. This could be dangerous for children when they carelessly insert their finger into the rotating wheel and get hurt by the sweeping spokes.

It is the object of the present invention to provides an activating device having an activating element moved axially, by the centrifugal force provided by the rotating wheel, to electrically connect two conductive plates such that alarming sound and lighting are generated for warning. Therefore, the children can be alarmed that the wheel is rotating and be prevented from harm.

The various objects and advantages of the present invention will be more readily understood from the following detailed description when read in conjunction with the appended drawing, in which:

DETAIL DESCRIPTION OF PREFERRED EMBODIMENT

Figure 1:
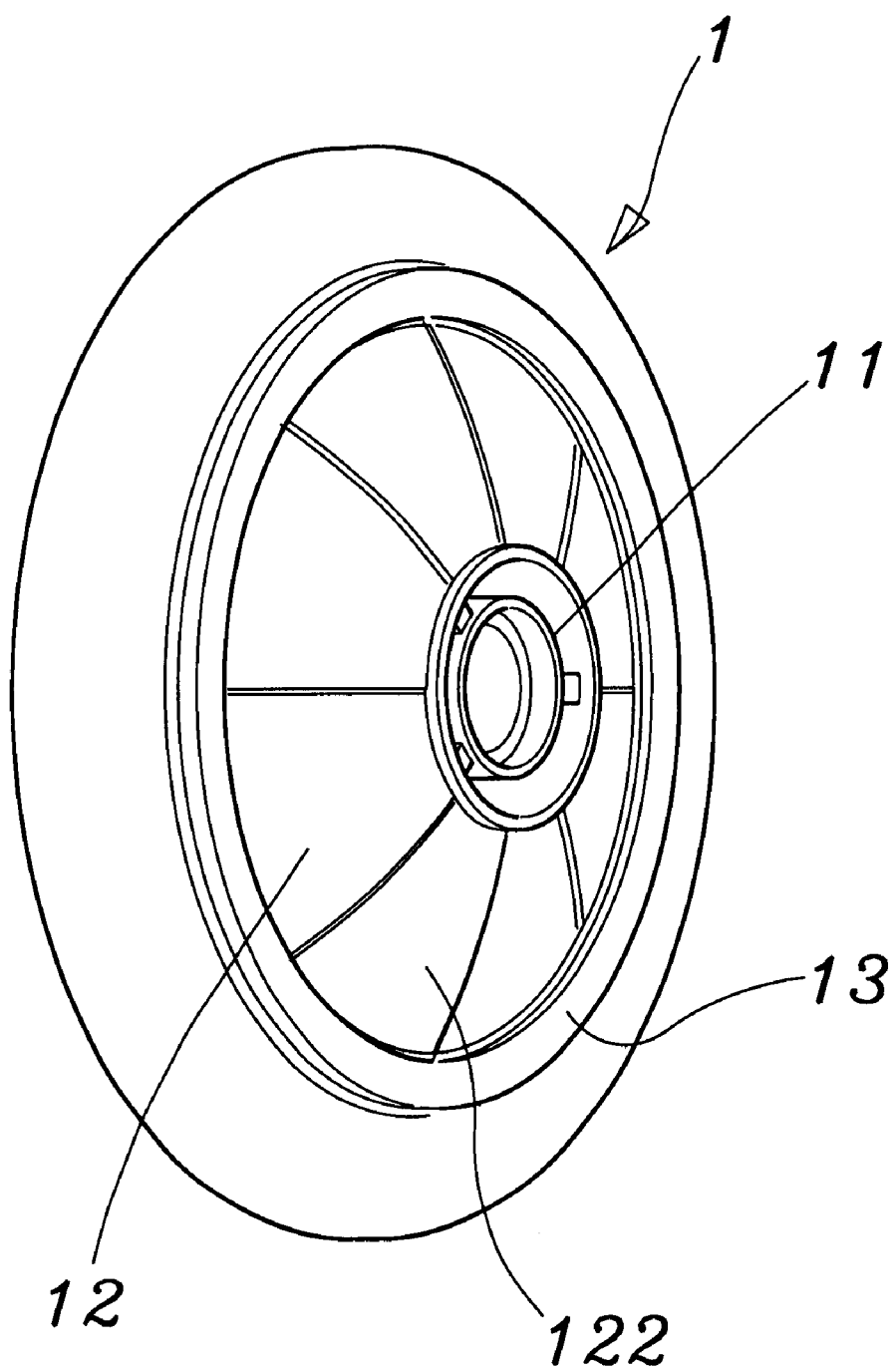
FIG. 1 is the perspective view of the present invention.
Figure 2:
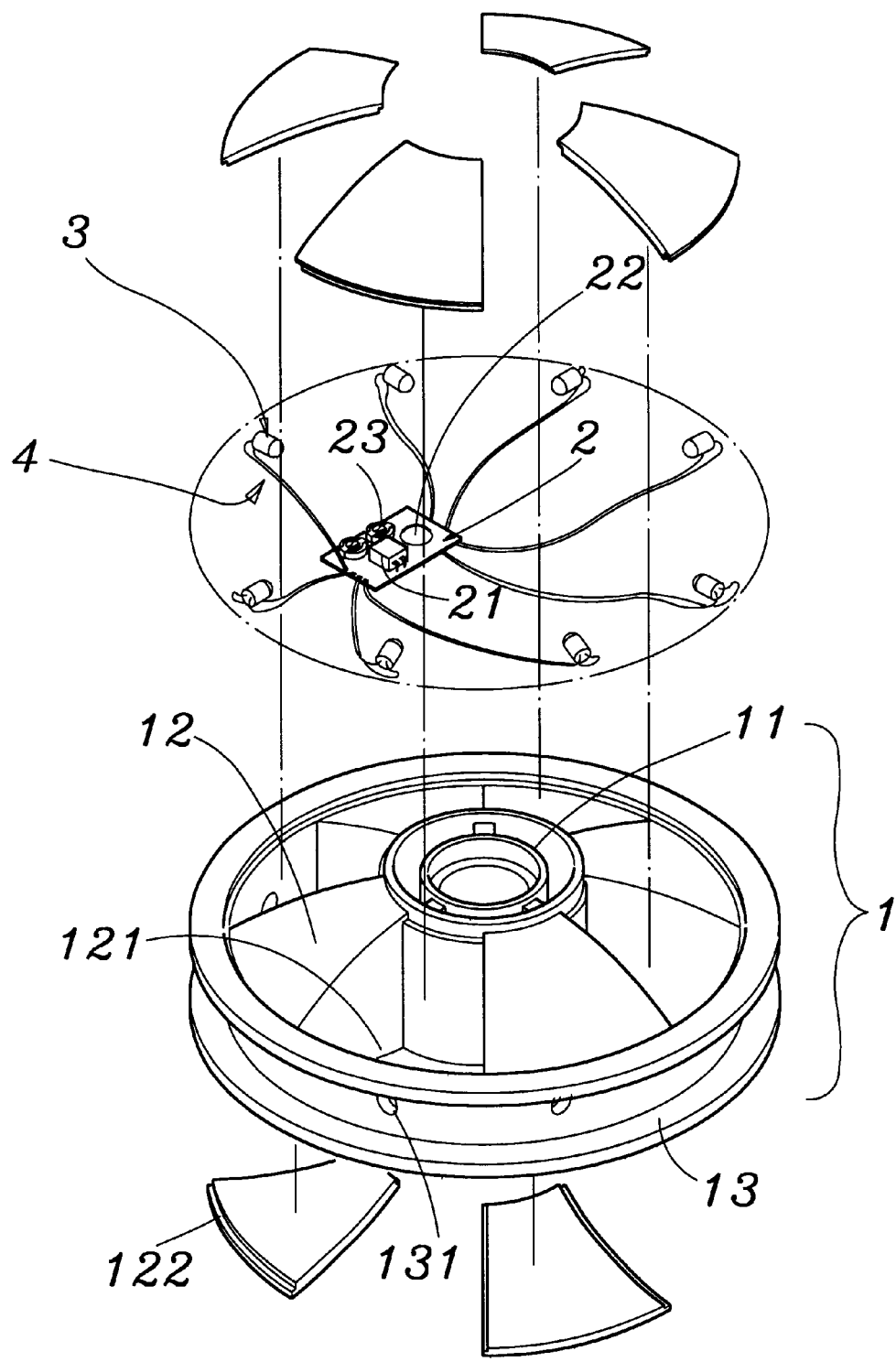
FIG. 2 is the exploded view of the present invention.
Figure 3A:
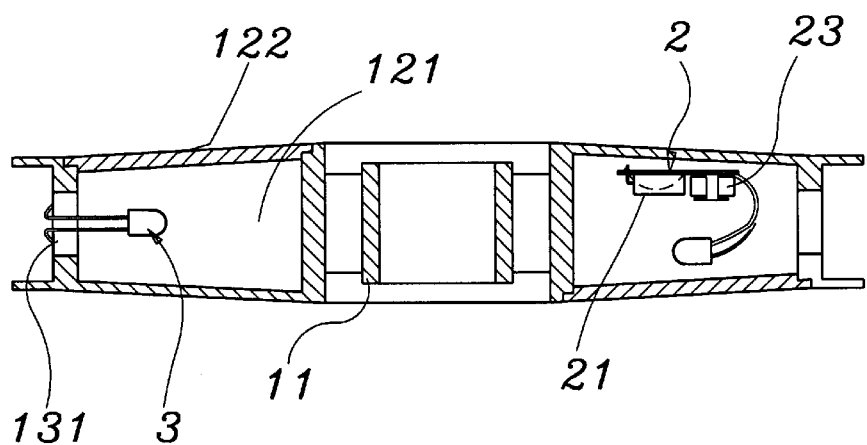
FIG. 3A is the cross section view of the present invention.
Figure 3B:
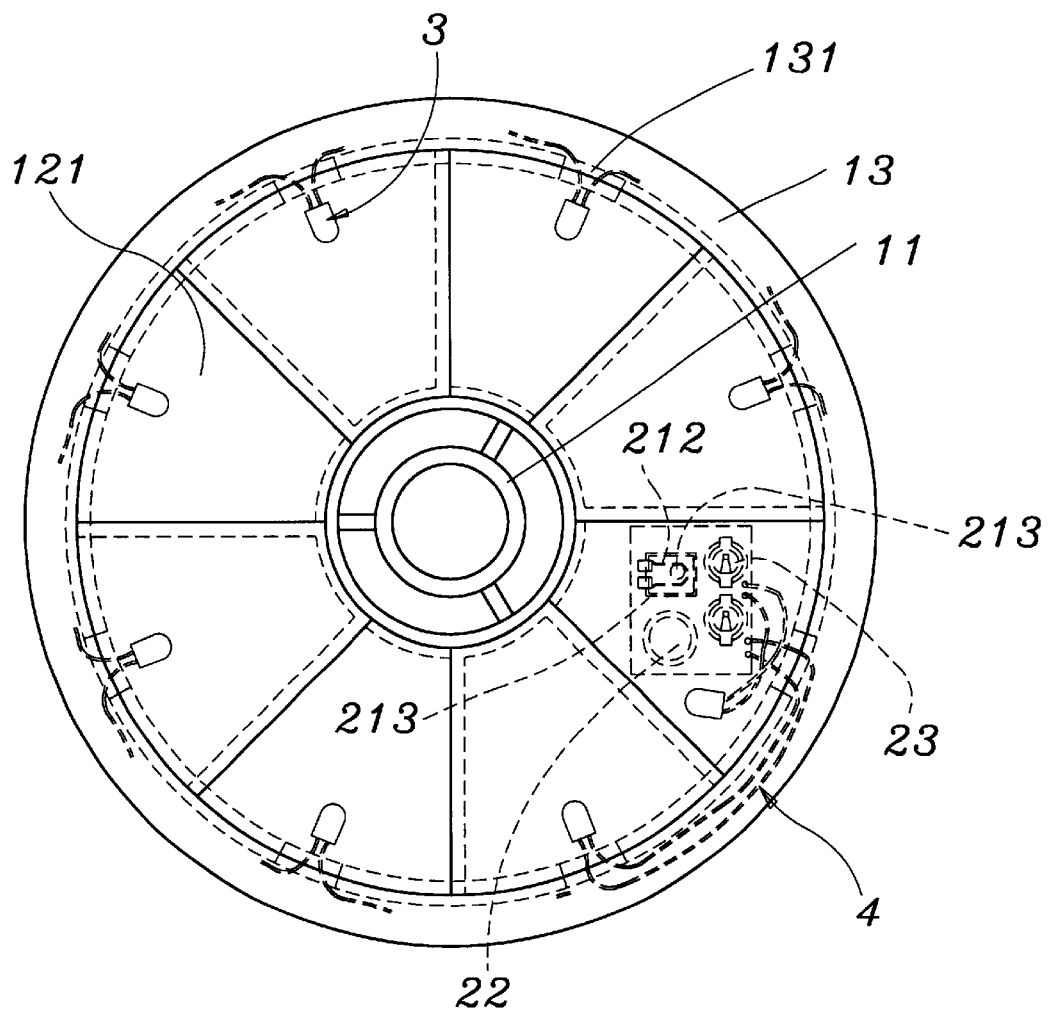
FIG. 3B is a schematic view showing the internal components of the present invention.
Figure 4:
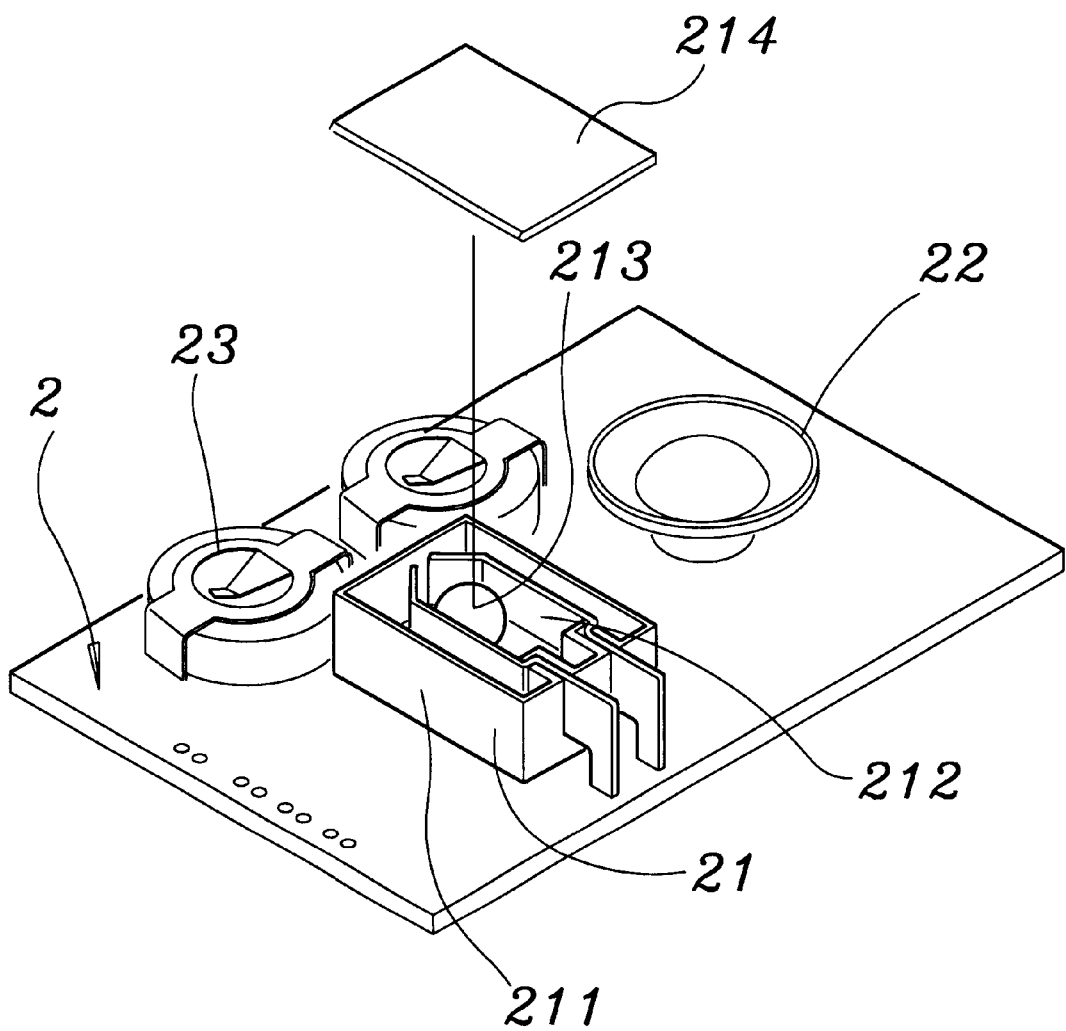
FIG. 4 is a schematic view showing the sound and light generating circuit of the present invention.

With reference to FIGS. 1–4, the present invention is intended to provide an activating device for light-emitting wheel, which comprises a wheel 1, a sound and light generating circuit 2, a plurality of light emitting elements 3 and a plurality of conductive wires 4.

The wheel 1 comprises a hub 11, a plurality of spokes 12 and a rim 13. The hub 11 is a cylinder arranged at the center of the wheel. The plurality of spokes 12 are radially arranged around the hub 11 such that an interspace chamber 121 is formed between two adjacent spokes 12. The opening of the interspace chamber 121 is open upward or downward alternatively and is sealed by a transparent lid 122. The transparent lid 122 is used to allow the transmission of light and prevent the insertion of finger. The transparent lid 122 can be of various color for aesthetic effect. The rim 13 is arranged around the outer contour of the plurality of spokes 12 and has a plurality of through holes 131 each corresponding to one interspace chamber 21.

The sound and light generating circuit 2 is arranged within one of the interspace chambers 121 and comprises an activating means 21, a sounder 22 and at least one battery. The activating element 21 comprises a housing case 211, two conductive plates 212 and an activating element 213. The housing case 211 is a rectangular insulating case with a top cover 214. The two conductive plates 212 are of the same structure and have slantingly bent bottom portions. The two conductive plates 212 are such mounted on the housing case 211 that a predetermined separation is kept between the two slantingly bent bottom portions thereof. The activating element 213 is placed between the two conductive plates 212 and can be mercury, roller or ball. The top cover 214 is covered on the top of the housing case 211 to seal the two conductive plates 212 and the activating element 213. The two slantingly bent bottom portions of the two conductive plates 212 are oriented along the radial direction of the wheel when the sound and light generating circuit 2 is arranged within one of the interspace chambers 121. Therefore, the activating element 213 is moved outward by the centrifugal force generated by the rotated wheel and provide electrical connection between the two conductive plates 212. The sounder 22 is a loud speaker and the battery 23 is used to supply electrical energy to the sound and light generating circuit.

The plurality of light emitting elements 3 can be, for examples, light emitting diodes and the two terminal thereof are arranged on the through holes 131 on the rim 13 of the wheel. The light emitting surface of the light emitting elements 3 is faced the inner surface of the interspace chambers 121. The plurality of conductive wires 4 provide necessary electrical connection for the light emitting elements 3 and the sound and light generating circuit 2. Therefore, the activating element 213 is moved outward by the centrifugal force generated by the rotated wheel 1 and provide electrical connection between the two conductive plates 212. The battery 23 provides electrical energy to the light emitting elements 3 for emitting warning light and the sounder 22 for raising a warning sound. In certain condition, it could be such designed that only the light emitting elements 3 functions when the wheel 1 is rotated.

Figure 5:
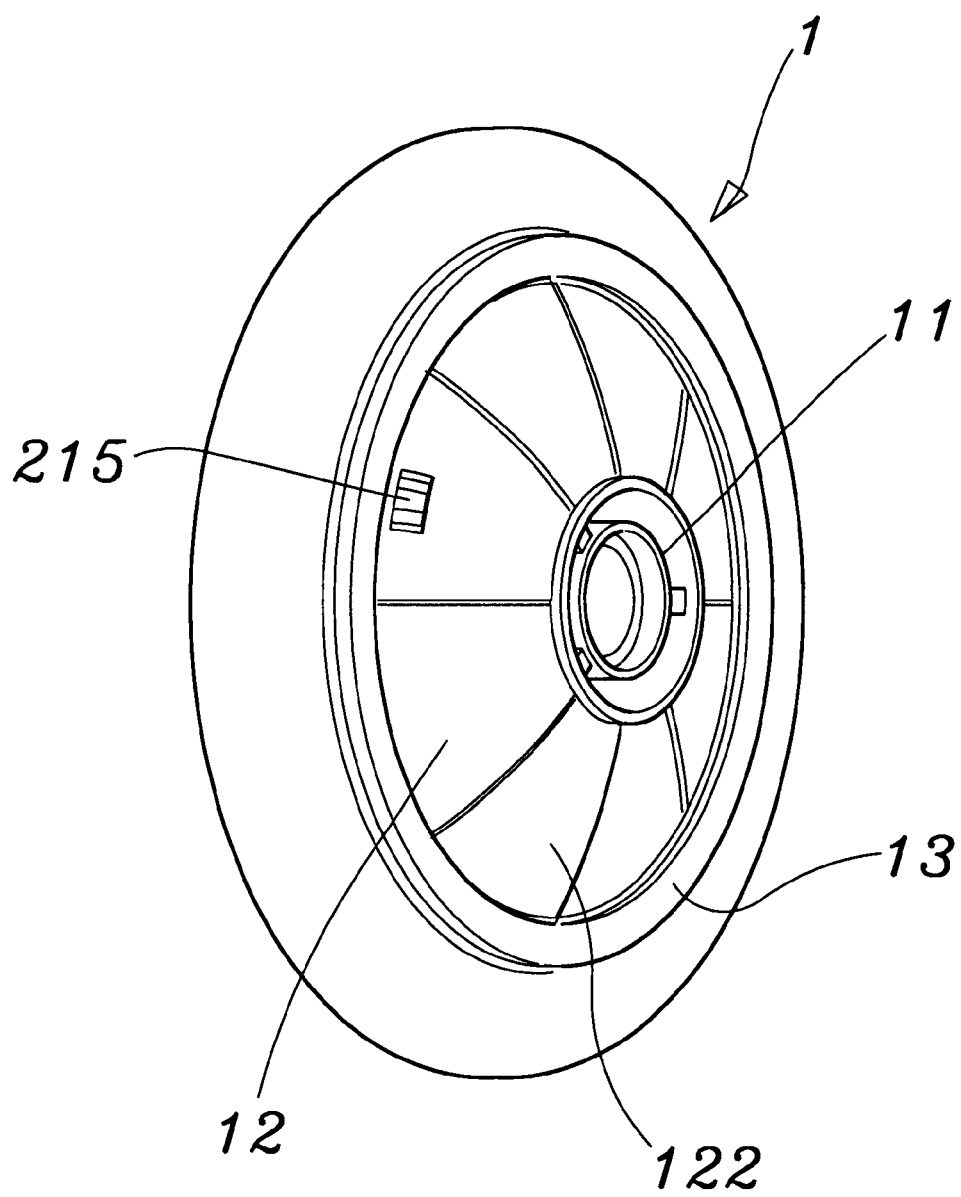
FIG. 5 shows the perspective view of a preferred embodiment of the present invention wherein a power switch is incorporated.

FIG. 5 shows the perspective view of a preferred embodiment of the present invention wherein a power switch 215 is incorporated on the sound and light generating circuit 2 and arranged on a dent on the transparent lid 122 to control the function of the sound and light generating circuit 2.

Figure 6:
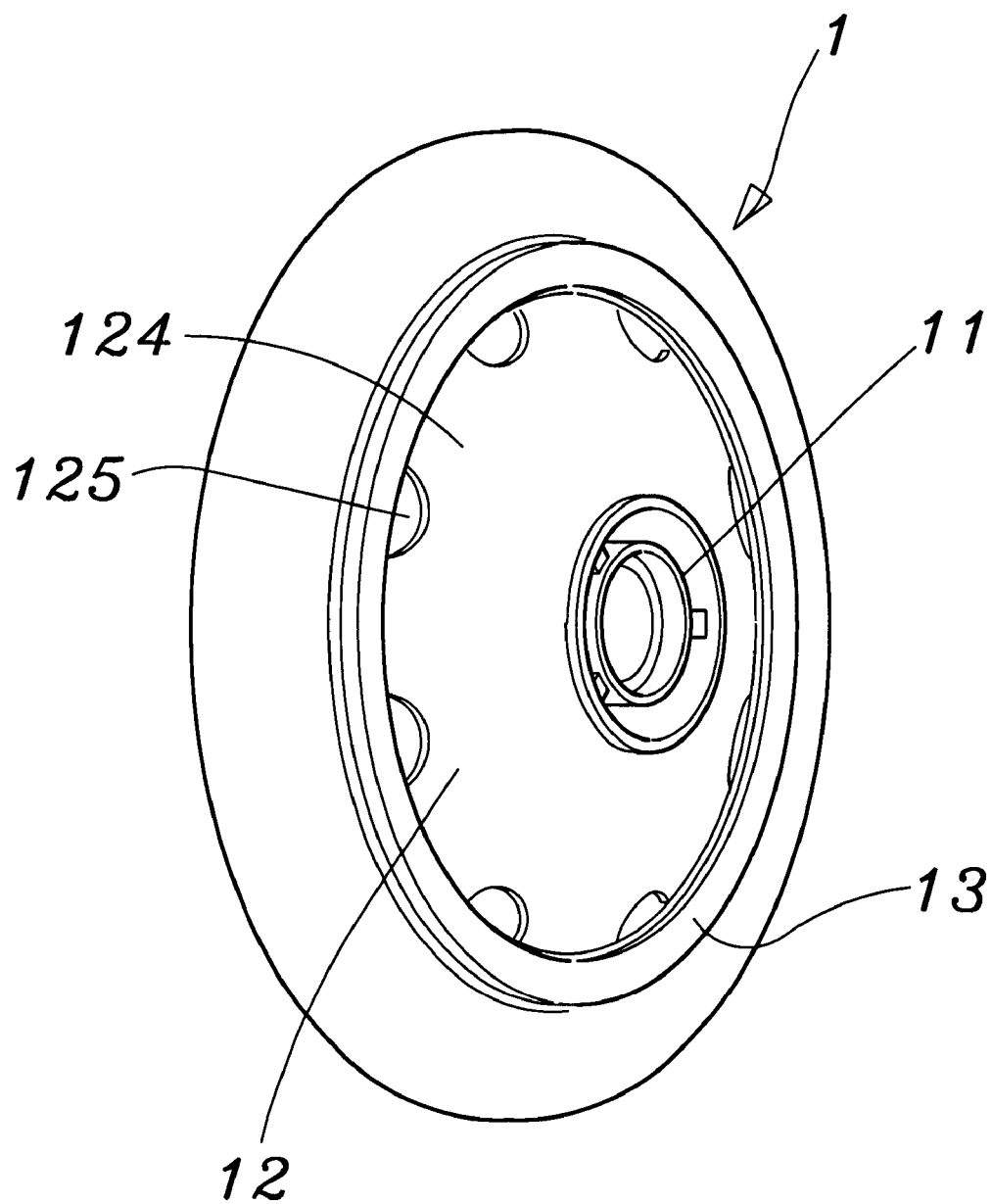
FIG. 6 shows the perspective view of another preferred embodiment of the present invention wherein a wheel cover is incorporated.

FIG. 6 shows the perspective view of another preferred embodiment of the present invention wherein a wheel cover 124 is incorporated to cover the spoke 12 and has a plurality of light emitting slits 125 on the perimeter thereof and each corresponding to the interspace chambers 121.

To sum up, the present invention has following advantages

1. The activating element is moved outward by the centrifugal force generated by the rotated wheel and provide electrical connection between the two conductive plates, whereby a light emitting element is triggered to emit a warning light.
2. The activating device for light-emitting wheel can be designed to generate both audio and visual signal.
3. The activating device can be advantageously adapted on a childs toy, thus providing more safety to children.
4. The activating device can provide a more amusing effect to children.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. An activating device for light-emitting wheel comprising:
   - a wheel having a hub at the center of said wheel, a plurality of spokes radially arranged around said hub and a rim arranged around the outer contour of said plurality of spokes;
   - a sound and light generating circuit arranged within at least one of said spokes and comprising an activating means and at least one battery, said activating means having a housing case, two conductive plates, an activating element and a top cover on said housing case, said two conductive plates being of the same structure and having slantingly bent bottom portions, said two conductive plates such mounted on said housing case that a predetermined separation is kept between the two slantingly bent bottom portions thereof, said activating element placed between said two conductive plates;
   - a plurality of light emitting elements arranged on said rim;
   - a plurality of conductive wires providing necessary electrical connection for said light emitting elements and said sound and light generating circuit;
   - said activating element moved outward by the centrifugal force generated by the rotated wheel and providing electrical connection between said two conductive plates, whereby said battery supplying electrical power to said light emitting element for emitting warning light.

2. The activating device for light-emitting wheel as in claim 1, wherein said hub is a hollow cylinder.

3. The activating device for light-emitting wheel as in claim 1, wherein an an interspace chamber is formed between two adjacent spokes, the opening of said interspace chamber is open upward or downward alternatively and is sealed by a transparent lid, said rim having a plurality of through holes each corresponding to one interspace chamber.

4. The activating device for light-emitting wheel as in claim 3, wherein said sound and light generating circuit is arranged within one of said interspace chambers.

5. The activating device for light-emitting wheel as in claim 1, wherein said sound and light generating circuit further comprises a sounder to raise sound when said wheel is rotated.

6. The activating device for light-emitting wheel as in claim 5, wherein said sounder is a loud speaker.

7. The activating device for light-emitting wheel as in claim 1, wherein said activating element can be selected from the group consisting mercury, roller and ball and preferably be a ball.

8. The activating device for light-emitting wheel as in claim 1, wherein said housing case is a rectangular insulating case.

9. The activating device for light-emitting wheel as in claim 3, wherein said plurality of light emitting elements are light emitting diodes and the two terminals thereof are arranged on said through holes, the light emitting surface of the light emitting elements faces the inner surface of said interspace chambers.

10. The activating device for light-emitting wheel as in claim 3, wherein a power switch is incorporated on said sound and light generating circuit and arranged on a dent on the transparent lid to control the function of said sound and light generating circuit.

11. The activating device for light-emitting wheel as in claim 3, wherein a wheel cover is incorporated to cover the spoke and has a plurality of light emitting slits on the perimeter thereof and each corresponding to the interspace chambers.

* * * * *